Aug. 11, 1964     M. P. WOLPIN     3,143,925
SERVO MECHANISM
Filed Oct. 11, 1961
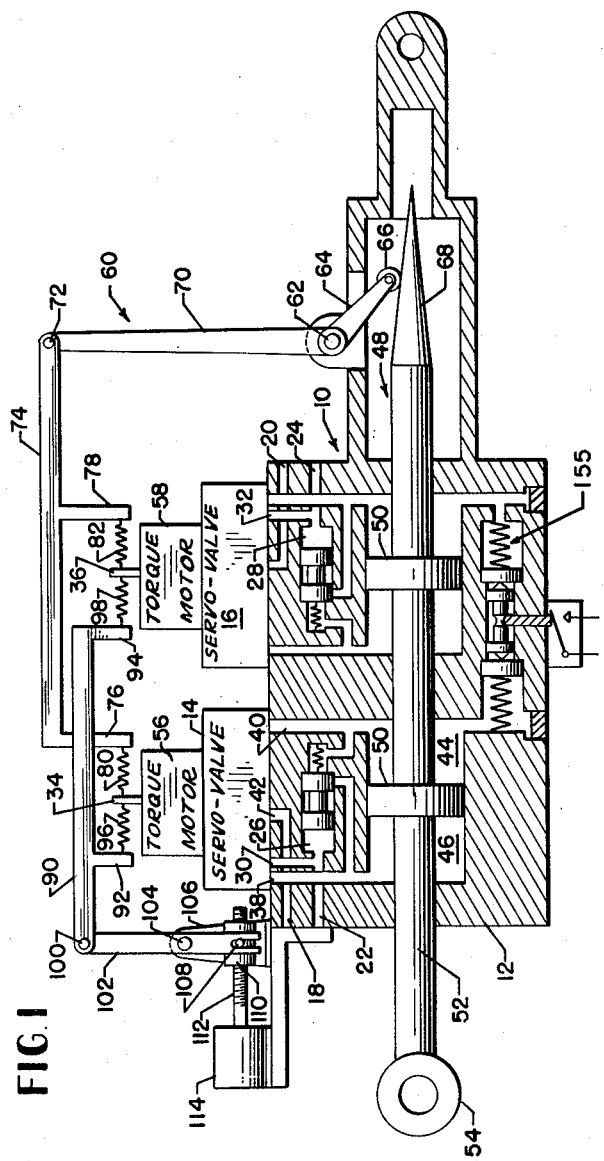
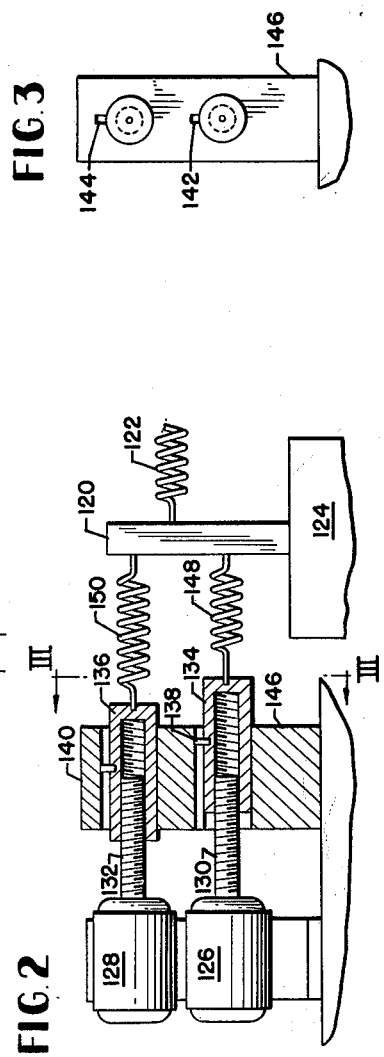
INVENTOR
MARTIN P. WOLPIN
BY *Beau, Brooks, Buckley + Beau*
ATTORNEY 3,143,925
SERVO MECHANISM
Martin P. Wolpin, Tonawanda, N.Y., assignor to Bell Aerospace Corporation, Wheatfield, N.Y.
Filed Oct. 11, 1961, Ser. No. 144,474
1 Claim. (Cl. 91—367)

This invention relates to servo mechanisms in general and pertains more particularly to servo mechanisms having a control feedback arrangement of improved form.

Of primary concern in connection with the present invention is to increase the fail safety of actuators suitable for electrically linked flight control systems. More particularly, the present invention relates to means for mechanically trimming a control surface associated with a servo mechanism and to, in the process, effect an irreversible trim action so that upon power failure, the trimmed position will be maintained to thereby provide a fail safe system. In prior art systems of this general nature, trimming action is achieved solely by electrical means so that in order to hold and maintain a certain degree of trim, the system will require the application of a steady electrical trim signal to hold the controlled surface position. Thus, if there is a loss or interruption of electrical power, or if one of the component parts of the electrical trim system fails, the servo mechanism will return to its neutral position which might be far from the trim position so that the effect thereof would introduce a considerable hazard to the aircraft or the like with which the servo mechanism is associated. In accord with the present invention, the trim position of an associated controlled surface is achieved, through a hydraulic servo mechanism, by means of mechanical mechanism which is irreversible in nature so that should power failure occur, the degree of trim present at the time of failure will be maintained and held without returning the servo actuator to its neutral position.

Other objects and advantages of the invention will appear from the description hereinbelow and the accompanying drawings wherein:

FIG. 1 is a sectional view taken through a servo mechanism showing a mechanical trim control mechanism according to this invention associated therewith;

FIG. 2 is a modified form of trim actuator shown on enlarged scale; and

FIG. 3 is a vertical section taken substantially along the plane of section line 3—3 in FIG. 2.

Referring now more particularly to FIG. 1, a servo mechanism is indicated generally therein by the reference character 10 and will be seen to consist essentially of a body 12 having a plurality of passages and chambers therewithin. Forming an integral part of or fixedly mounted upon the body 12 are a pair of servo valve mechanisms 14 and 16 which may in themselves be of previously known form as for example as is disclosed in copending applications Serial Nos. 511,088 filed May 25, 1955 and 652,608 filed Apr. 12, 1957, now Patent No. 3,078,863. Associated with each servo valve 14 and 16 is a return line such as those indicated by reference characters 18 and 20 and a pressure line such as those indicated by reference characters 22 and 24. The pressure lines 22 and 24 connect to the chambers 26 and 28 respectively, and, through branch lines 30 and 32, to the respective servo valve mechanisms 14 and 16. Each servo valve is provided with a control member or flapper such as those indicated by reference characters 34 and 36 which are adapted to operate, upon deflection thereof, to connect one of the passages 38 and 40, in the instance of the left hand servo valve 14 in FIG. 1, to pressure through the passageway 30, while the other passage to the return line, through the return line passage 42. For example, if the chamber 44 in FIG. 1 is connected, by means of the servo valve 14 to a return line 18 while the chamber 46 is connected to the pressure line 22, movement of the actuating assembly indicated generally by the reference character 48 will be to the right in FIG. 1. A like action is extant with regard to the right hand side of the mechanism shown in FIG. 1. In each instance, the chambers 44 and 46 act on opposite sides of a piston member 50 to obtain the requisite motion of the actuator rod 52. The actuator rod is provided with suitable means such as the eye 54 so as to be connected to suitable mechanism for moving the associated control surface.

Controlled deflection of the flappers 34 and 36 is achieved under the action of torque motors 56 and 58 which initiate the control action of the actuating mechanism. Conventionally, a feedback mechanism indicated generally by the reference character 60 is associated with the flappers 34 and 36. This feedback mechanism may consist of a crank pivoted at 62 and provided with a lower arm 64 having a roller or shoe 66 engaged upon a tapered end portion 68 of the actuator rod and having also an arm portion 70 rigid with the arm portion 64 linked pivotally as at 72 to a bar or rod member 74 having depending legs 76 and 78 connected, through suitable tension springs 80 and 82 to the flappers 34 and 36 respectively. By this arrangement, movement of the actuator assembly 48 is fed back or reflected back to the flappers 34 and 36 so that upon a steady state operation, the feedback springs 80 and 82 will return the flappers 34 and 36 to their neutral position such as to disconnect the channels 38 and 40 from either the pressure or return lines 18 or 22, or a corresponding action for the right hand side of FIG. 1.

In order to introduce a trim action into the system, a trim bar 90 is provided which includes depending arm portions 92 and 94 connected to the respective flappers 34 and 36 through the trim control springs 96 and 98. The bar or rod 90 is pivotally connected at one end as at 100, to the upper end of a lever 102 which is in turn pivotally connected as at 104 to a suitable support mechanism such as the bracket 106, the lower end of this lever 102 being slotted as shown to receive the actuating pin 108. The actuating pin 108 is carried by a traveling nut member 110 screwthreadedly engaged upon the actuating shaft 112 which forms an extension for the drive shaft of the electric motor 114. It will be appreciated that electrical trim signals are fed to the motor 114 to effect rotation of the shaft 112 until the traveling nut 110 has positioned the bar 90 in such fashion as to establish the desired trim position to the flappers 34 and 36 to the medium of the trim control springs 96 and 98.

In this fashion, it will be manifest that since the action of the traveling nut 110 and rotating shaft 112 is irreversible, should a power failure or interruption occur, the trimmed position of the actuator 48 as effected through the medium of the control springs 96 and 98 will be maintained rather than having the flappers 34 and 36 returned to their neutral position as would be the case with a purely electrical trim control system.

A modified form of the invention is shown in FIGS. 2 and 3. In this particular form of the invention, in contrast with the form shown in FIG. 1, the device is applicable to instances wherein a large trim authority is required. When such large trim authority is required, means must be provided to cope with runaway trim failure or inability to trim. The mechanism shown in FIGS. 2 and 3 will achieve these objectives. In FIG. 2, reference character 120 represents a servo valve flapper or armature having a feedback spring 122 connected thereto, the torque motor being indicated by reference character 124. Two trim motors are provided, the normal trim control motor 126 and the emergency trim control motor 128. Both of these are provided with screw-threaded drive shafts 130 and 132 respectively having traveling nut members 134 and 136 associated therewith. Each of the traveling nut members is provided with a pin such as those indicated by reference characters 138 and 140 operating in slots 142 and 144 in the standard or guide 146 for the traveling nuts, see particularly FIG. 3, and the two traveling nuts are connected to the flapper 120 through the trim control spring 148 and the emergency trim control spring 150. Under normal conditions, the emergency trim motor 128 is stationary and the emergency spring 150 is of such stiffness as to permit the normal control spring 148 to effect trim to any position. However, should the normal trim become inoperative or runaway to a stop, the emergency trim motor 128 is automatically called into action to take over from the normal control system. It will be appreciated that by controlling the stiffness of the two springs 148 and 150, either the normal or the emergency trim control systems may be operative throughout the entire range required regardless of the effect of the other.

Thus, a simple yet wholly effective trim mechanism is associated with a conventional servo valve assemblage which is completely fail safe by virtue of its ability to maintain a given trim position regardless of power interruption or failure. As previously stated, the servo mechanism 10 previously described together with its associated servo valves 14 and 16 is of previously known construction as for example is disclosed in copending applications Serial Nos. 511,088, filed May 25, 1955, and 652,608, filed Apr. 12, 1957, per se, and forms no part of the present invention other than in its combinational usage in conjunction with the trim mechanism hereinabove described. As shown in FIG. 1, the auxiliary mechanism may also incorporate failure detection means involving the pistons shown in chambers 26, 28 and a component designated generally at 155; as shown and explained in detail for example in U.S. Patent No. 2,995,014.

It is to be understood that certain changes and modifications as illustrated and described may be made without departing from the spirit of the invention or the scope of the following claim.

A servo mechanism comprising a body having an actuator reciprocally mounted therein, said actuator having at least one piston portion and said body presenting chambers on either side thereof for effecting movement of said actuator, a servo valve associated with said body and having fluid pressure passages connected to said chambers, said servo valve also including a movable flapper for effecting differential pressure in said passages and a torque motor for moving said flapper, a feedback link spring connected to said flapper and connected to said actuator for movement in coordination therewith, secondary control means spring-connected to said flapper for biasing the same, said secondary control means including an electric motor and irreversible mechanism driven thereby for maintaining secondary control effect regardless of power interruption, and auxiliary secondary control means including irreversible mechanism spring-connected to said flapper, the spring constants of the two spring connections between the secondary control means and the finger and the auxiliary control means and the flapper being different to permit full trim authority to be achieved by either regardless of failure of either of such secondary control means.

References Cited in the file of this patent
UNITED STATES PATENTS

| | | |
|---|---|---|
| 2,514,314 | Denton | July 4, 1950 |
| 2,625,136 | Moog | Jan. 13, 1953 |
| 2,719,684 | Peed | Oct. 4, 1955 |
| 2,772,841 | Bonsteel | Dec. 4, 1956 |
| 2,831,643 | Rasmussen et al. | Apr. 22, 1958 |
| 2,902,607 | Hedger et al. | Sept. 1, 1959 |
| 2,947,285 | Baltus et al. | Aug. 2, 1960 |
| 2,947,286 | Baltus et al. | Aug. 2, 1960 |